(12) United States Patent
Nelson

(10) Patent No.: US 8,286,757 B2
(45) Date of Patent: Oct. 16, 2012

(54) WHEEL CHOCK SYSTEM

(75) Inventor: Kyle Nelson, Cedarburg, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 12/833,697

(22) Filed: Jul. 9, 2010

(65) Prior Publication Data

US 2012/0006632 A1    Jan. 12, 2012

(51) Int. Cl.
  *B61H 13/00*    (2006.01)
(52) U.S. Cl. ........................................ 188/4 R; 188/36
(58) Field of Classification Search ............... 188/4 R, 188/32, 36; 414/396, 401, 426, 429; 410/9, 410/19, 30, 49, 52
See application file for complete search history.

(56) References Cited

U.S. PATENT DOCUMENTS

| | | | |
|---|---|---|---|
| 1,102,773 | A | 7/1914 | Martin |
| 2,413,744 | A | 1/1947 | Carter |
| 2,773,564 | A | 12/1956 | Garard, Sr. |
| 2,858,905 | A | 11/1958 | Fahland |
| 3,110,466 | A | 11/1963 | O'Sullivan |
| 3,221,907 | A | 12/1965 | O'Sullivan |
| 3,305,049 | A | 2/1967 | Willey |
| 3,447,639 | A | 6/1969 | Parr |
| 3,542,157 | A | 11/1970 | Noah |
| 3,666,118 | A | 5/1972 | Raynes et al. |
| 3,667,160 | A | 6/1972 | Salloum |
| 3,797,410 | A | 3/1974 | Blunden |
| 4,013,145 | A | 3/1977 | Mumm |
| 4,024,820 | A | 5/1977 | Hilnsky et al. |
| 4,122,629 | A | 10/1978 | Rennick |
| 4,146,888 | A | 3/1979 | Grunewald et al. |
| 4,191,503 | A | 3/1980 | Neff et al. |
| 4,207,019 | A | 6/1980 | Cone |

(Continued)

FOREIGN PATENT DOCUMENTS

CA    1308222    10/1992

(Continued)

OTHER PUBLICATIONS

European Patent Office, "Office Communication," issued in connection with European application serial No. 08 770 160.3, issued Jul. 7, 2010, 3 pages.

(Continued)

*Primary Examiner* — Christopher Schwartz
(74) *Attorney, Agent, or Firm* — Hanley, Flight & Zimmerman, LLC (57) ABSTRACT

A wheel restraint for restraining a vehicle at a loading dock includes various features such as, a wheel chock supported by a spring loaded articulated arm with a spring that can be selectively tightened or released, a sensor that detects whether the chock is solidly against a base plate or floor, a bi-directional pivotal joint between the articulated arm and the wheel chock to ensure that the chock can sit squarely on a mating base plate, a wheel chock that meshes with a hydraulically actuated base plate, pivotal or otherwise movable backstops that prevent a wheel chock from sliding out of position, and a base plate cleaning system. The wheel restraint also includes a first vertical resistance feature that is coupled to the base and a second vertical resistance feature that is coupled to the wheel chock to limit vertical movement between the wheel chock and the base when the first vertical resistance feature engages the second vertical resistance feature.

20 Claims, 11 Drawing Sheets

U.S. PATENT DOCUMENTS

| | | | |
|---|---|---|---|
| 4,208,161 | A | 6/1980 | Hipp et al. |
| 4,216,724 | A | 8/1980 | Grillet |
| 4,264,259 | A | 4/1981 | Hipp |
| 4,267,748 | A | 5/1981 | Grunewald et al. |
| 4,282,621 | A | 8/1981 | Anthony et al. |
| 4,373,847 | A | 2/1983 | Hipp et al. |
| 4,379,354 | A | 4/1983 | Hahn et al. |
| 4,443,150 | A | 4/1984 | Hahn et al. |
| 4,472,099 | A | 9/1984 | Hahn et al. |
| 4,560,315 | A | 12/1985 | Hahn |
| 4,572,080 | A | 2/1986 | Williams et al. |
| 4,605,353 | A | 8/1986 | Hahn et al. |
| 4,634,334 | A | 1/1987 | Hahn et al. |
| 4,653,967 | A | 3/1987 | Isaksson et al. |
| 4,674,929 | A | 6/1987 | Blund |
| 4,674,941 | A | 6/1987 | Hageman |
| 4,676,344 | A | 6/1987 | Locicero |
| 4,679,974 | A | 7/1987 | Blunden |
| 4,695,216 | A | 9/1987 | Erlandsson |
| 4,728,242 | A | 3/1988 | Erlandsson |
| 4,759,678 | A | 7/1988 | Hageman |
| 4,765,792 | A | 8/1988 | Cherry et al. |
| 4,767,254 | A | 8/1988 | Kovach et al. |
| 4,784,567 | A | 11/1988 | Hageman et al. |
| 4,815,918 | A | 3/1989 | Bennett et al. |
| RE32,968 | E | 6/1989 | Hahn |
| 4,854,790 | A | 8/1989 | Andre |
| 4,861,217 | A | 8/1989 | Erlandsson |
| 4,865,508 | A | 9/1989 | Carlson |
| RE33,154 | E | 1/1990 | Hahn et al. |
| 4,915,568 | A | 4/1990 | West |
| RE33,242 | E | 6/1990 | Hipp et al. |
| 4,938,647 | A | 7/1990 | Erlandsson |
| 4,963,068 | A | 10/1990 | Gelder |
| 4,969,792 | A | 11/1990 | Ellis et al. |
| 4,973,213 | A | 11/1990 | Erlandsson |
| 4,979,856 | A * | 12/1990 | Blunden et al. .................. 410/9 |
| 5,037,255 | A | 8/1991 | Bullock et al. |
| 5,096,021 | A | 3/1992 | Tart |
| 5,249,905 | A | 10/1993 | Warner et al. |
| 5,302,063 | A | 4/1994 | Winsor |
| 5,375,965 | A | 12/1994 | Springer et al. |
| 5,464,076 | A | 11/1995 | Benedetto, Jr. |
| 5,531,557 | A | 7/1996 | Springer |
| 5,547,045 | A | 8/1996 | Stutzman |
| 5,582,498 | A | 12/1996 | Springer et al. |
| 5,655,631 | A | 8/1997 | Richardson |
| 5,685,397 | A | 11/1997 | Maddox et al. |
| 5,689,981 | A | 11/1997 | DeLuca et al. |
| 5,692,402 | A | 12/1997 | Clements |
| 5,709,518 | A | 1/1998 | Alexander et al. |
| 5,711,110 | A | 1/1998 | Williams et al. |
| 5,743,697 | A | 4/1998 | Alexander |
| 5,762,459 | A | 6/1998 | Springer et al. |
| 5,896,957 | A | 4/1999 | Berends et al. |
| 5,908,274 | A | 6/1999 | Silberman |
| 5,934,857 | A | 8/1999 | Alexander |
| 6,082,952 | A | 7/2000 | Alexander |
| 6,092,970 | A | 7/2000 | Hahn et al. |
| 6,123,496 | A | 9/2000 | Alexander |
| 6,199,668 | B1 | 3/2001 | Gorza et al. |
| 6,238,163 | B1 | 5/2001 | Springer et al. |
| 6,250,432 | B1 | 6/2001 | Hageman et al. |
| 6,276,496 | B1 | 8/2001 | Hageman et al. |
| RE37,570 | E | 3/2002 | Springer et al. |
| 6,357,987 | B1 | 3/2002 | Palus |
| 6,371,253 | B1 | 4/2002 | Berends et al. |
| 6,505,713 | B1 | 1/2003 | Paul et al. |
| 7,032,720 | B2 | 4/2006 | Jette et al. |
| 7,264,092 | B2 * | 9/2007 | Jette ............................... 188/36 |
| 2006/0051196 | A1 | 3/2006 | McDonald |
| 2009/0026022 | A1 | 1/2009 | Andersen et al. |
| 2009/0223764 | A1 | 9/2009 | Andersen et al. |
| 2010/0260586 | A1 * | 10/2010 | Manone et al. ............. 414/401 |

FOREIGN PATENT DOCUMENTS

| | | |
|---|---|---|
| CA | 2164737 | 6/1997 |
| CA | 2164738 | 6/1997 |
| CA | 2419680 | 8/2003 |
| DE | 583404 | 9/1933 |
| DE | 2735826 | 2/1979 |
| DE | 205852 | 1/1984 |
| DE | 3830891 | 3/1990 |
| DE | 4120035 | 12/1992 |
| DE | 4119480 | 1/1993 |
| DE | 4242415 | 2/1994 |
| DE | 4401653 | 10/1995 |
| DE | 4427406 | 10/1995 |
| EP | 0025399 | 3/1983 |
| EP | 0284532 | 9/1988 |
| EP | 0302356 | 2/1989 |
| EP | 0366571 | 5/1990 |
| EP | 0384850 | 8/1990 |
| EP | 0442245 | 8/1991 |
| EP | 0537075 | 4/1993 |
| EP | 0580415 | 7/1993 |
| EP | 0609049 | 1/1994 |
| EP | 0639488 | 2/1995 |
| EP | 0775653 | 5/1997 |
| EP | 1095880 | 2/2001 |
| FR | 1469877 | 2/1967 |
| FR | 2284481 | 4/1976 |
| FR | 2394423 | 1/1979 |
| FR | 2652340 | 9/1989 |
| FR | 2672578 | 8/1992 |
| FR | 2689845 | 10/1993 |
| FR | 2736336 | 1/1997 |
| GB | 1169298 | 11/1969 |
| IT | 526008 | 5/1955 |
| JP | 60036230 | 2/1985 |
| NL | 157253 | 6/1968 |
| SU | 1036593 | 8/1983 |
| WO | 9518029 | 7/1995 |
| WO | 9612665 | 5/1996 |
| WO | 9702201 | 1/1997 |
| WO | 9744220 | 11/1997 |
| WO | 9749627 | 12/1997 |
| WO | 2004078618 | 9/2004 |
| WO | 2009014815 | 1/2009 |

OTHER PUBLICATIONS

International Bureau, "International Preliminary Report on Patentability," issued in connection with international application serial No. PCT/US2008/065855, issued Jan. 26, 2010, 9 pages.

International Searching Authority, "International Search Report," issued in connection with international application serial No. PCT/US2008/065855, mailed Dec. 3, 2008, 4 pages.

International Searching Authority, "Written Opinion of the International Searching Authority," issued in connection with international application serial No. PCT/US2008/065855, mailed Dec. 3, 2008, 8 pages.

Photographs on Combar Wheel-Restraint Product, taken Nov. 1991, 2 pages.

Dyna Seal, "Load and Unload Safely with Dyna Seal Wheelblocker," with English Translation, Jan. 1993, 8 pages.

Pentalift, Inc., Drawings of Proposed Penta-Chock Installation for Coca Cola, Mar. 6, 1991, 2 pages.

Super Seal Mfg Ltd., "Super Seal Dock Seals," received by the United States Patent and Trademark Office on Aug. 29, 1989, 8 pages.

Photograph of Wheel Restraint installed at Unilever new Moscow, Russia, Installation observed and photograph taken on Mar. 1, 2007, 1 page.

Photographs of Kelley Auto Chock Truck Restraint, taked Jun. 1991, 2 pages.

Kelley, "Auto Chock Truck Restraint," Jan. 1991, 2 pages.

United States Patent and Trademark Office, "Non-Final Office Action," issued in connection with U.S. Appl. No. 11/828,039, issued Sep. 20, 2010, 23 pages.

United States Patent and Trademark Office, "Restriction Requirement," issued in connection with U.S. Appl. No. 11/828,039, issued Jul. 13, 2010, 10 pages.

United States Patent and Trademark Office, "Final Office Action," issued in connection with U.S. Appl. No. 11/828,039, mailed Jun. 14, 2011, 13 pages.

Canadian Intellectual Property Office, "Office Action," issued in connection with Canadian application serial No. 2,693,477, issued Oct. 5, 2011, 3 pages.

European Patent Office, "European Search Report," issued in connection with European application serial No. 11005605.8, mailed Nov. 15, 2011, 8 pages.

United States Patent and Trademark Office, "Non-Final Office Action," issued in connection with U.S. Appl. No. 11/828,039, mailed Feb. 9, 2012, 22 pages.

United States Patent and Trademark Office, "Notice of Allowance," issued in connection with U.S. Appl. No. 11/828,039, mailed Jul. 9, 2012, 10 pages.

Australian Governement IP Australia, "Examination Report," issued in connection with Australian application Ser. No. 2011203498, issued Aug. 10, 2012, 8 pages.

Canadian Intellectual Property Office, "Office Action," issued in connection with Canadian application Ser. No. 2,693,477, issued Jul. 4, 2012, 2 pages.

* cited by examiner

WHEEL CHOCK SYSTEM

FIELD OF THE DISCLOSURE

The present disclosure generally pertains to restraining a vehicle at a loading dock and more specifically to a wheel chock system.

BACKGROUND

When a truck, trailer or some other vehicle is parked at a loading dock, often some sort of vehicle restraint is used to keep the truck from inadvertently moving away from an elevated platform of the dock. This allows a forklift truck to safely drive between the dock platform and the truck for the purpose of loading or unloading the cargo inside the truck.

There are a variety of vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels.

Perhaps the most common wheel restraint is simply a wheel chock that wedges between the driveway and the underside of the wheel. However, wheel chocks often slip out of position on driveways that are slippery due to oil, rain, ice, sand, gravel or dirt. Moreover, wheel chocks usually are loose items that do not permanently attach to the loading dock area, so they often get misplaced.

One known example wheel restraint includes a wheel chock that is coupled to the loading dock by way of an articulated arm. To help prevent the chock from slipping out of its wheel-blocking position, the chock can be placed in mating engagement upon a serrated base plate that is anchored to the driveway. Although such a system can be effective, it does have some drawbacks.

First, a counterweight spring on the arm tends to prevent the wheel chock from resting its full weight upon the base plate. Second, the length to which the arm must extend to reach the wheel can adversely affect the angular relationship (about a vertical axis) between the mating surfaces of the chock and base plate. Third, although the known wheel restraint may include a sensor for detecting the presence of a wheel, the sensor does not indicate whether the chock is fully engaged with the serrations of the base plate. Finally, dirt, ice and other contaminants could hinder the engagement between the chock and the base plate, thus reducing the effectiveness of the chock.

DETAILED DESCRIPTION

Figure 1:
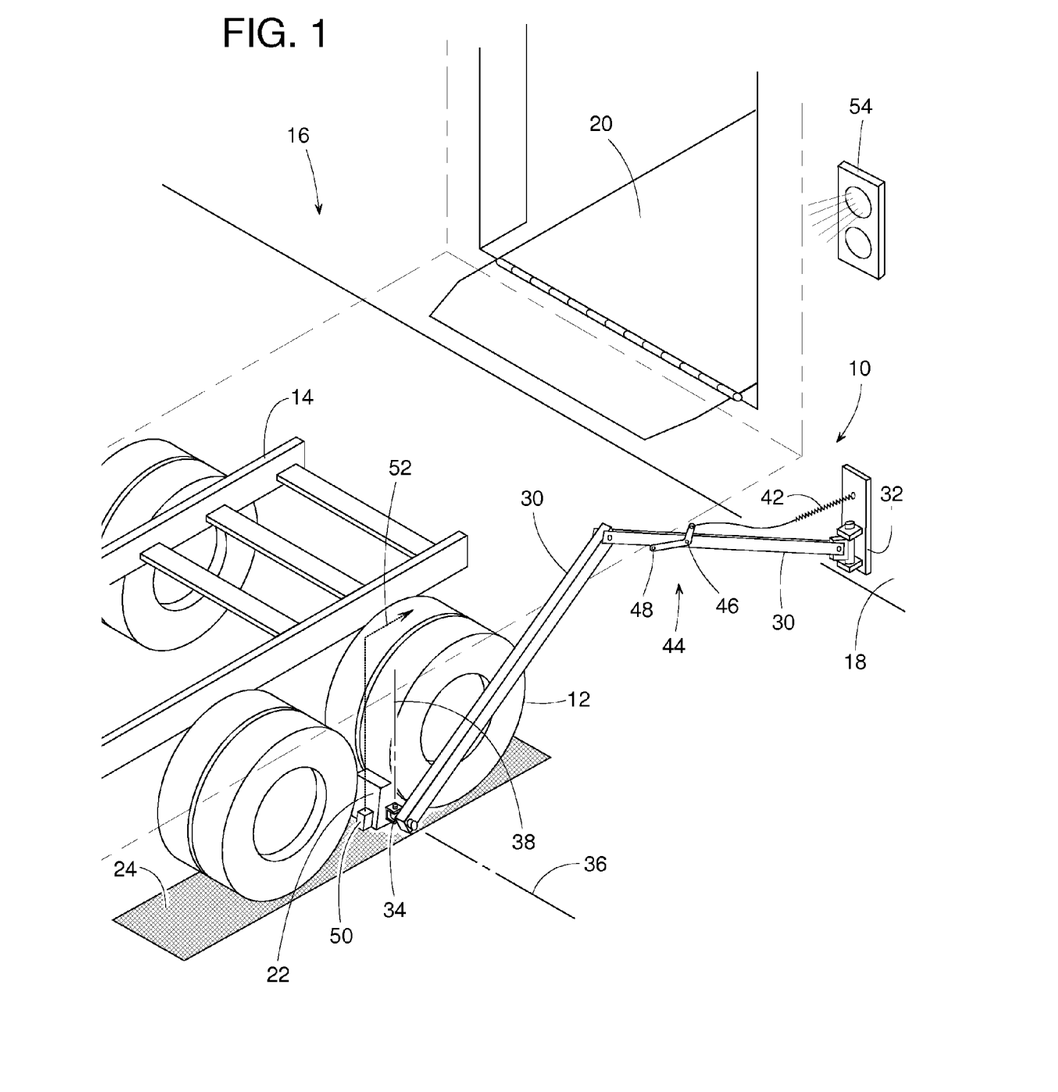
FIG. 1 is a perspective view a wheel restraint in a holding position.
Figure 2:
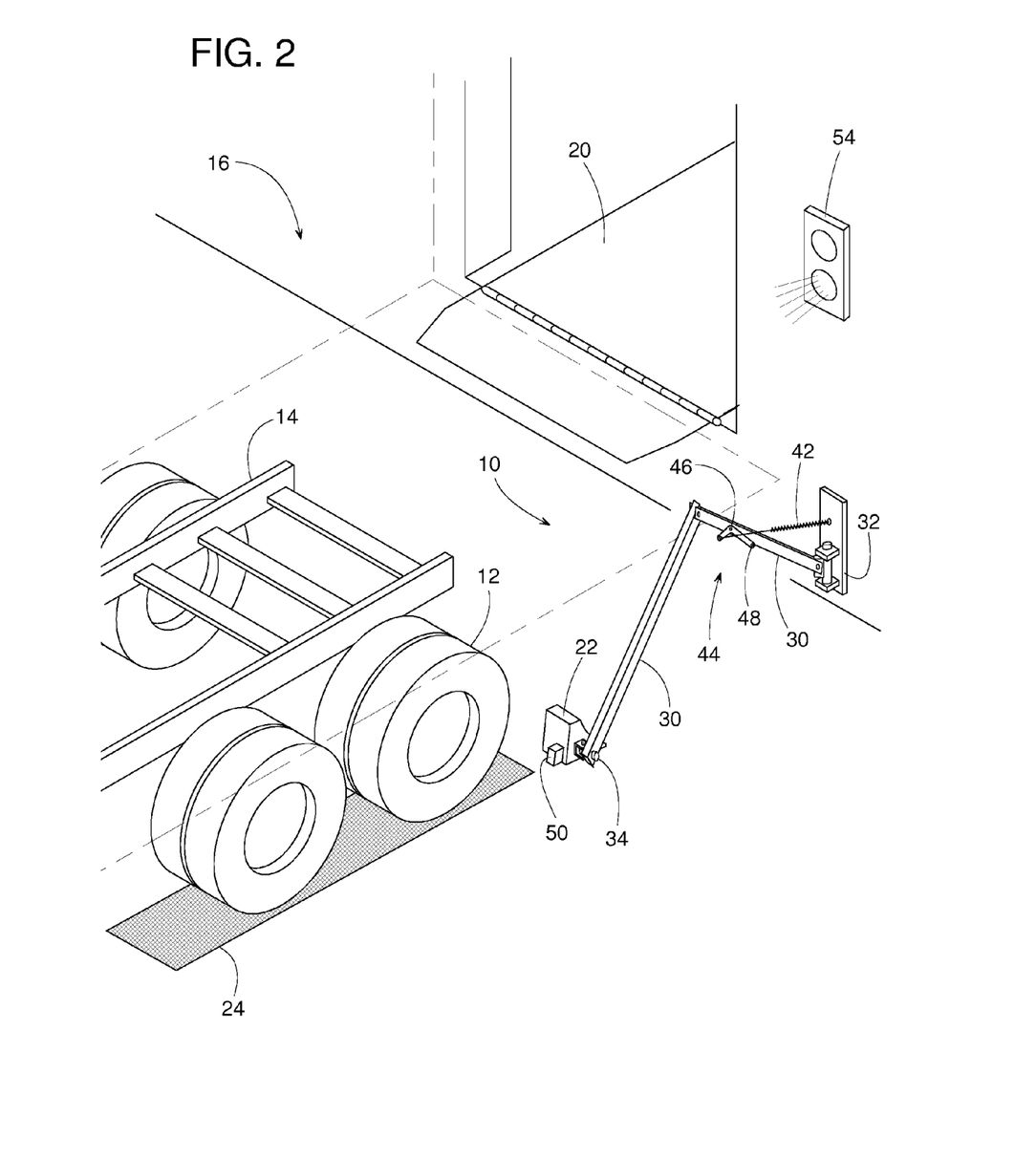
FIG. 2 is a perspective view of the wheel restraint of FIG. 1 but showing the restraint in a release position.

FIGS. 1 and 2 show a wheel restraint system 10 for restraining at least one wheel 12 of a vehicle 14 at a loading dock 16. Restraint 10 is shown in a holding position in FIG. 1 and is shown in a release position in FIG. 2. In the holding position, restraint 10 helps hold vehicle 14 adjacent to a dock face 18 so that cargo can be safely conveyed on and off of vehicle 14. In some cases, a conventional dock leveler 20 can be used to facilitate the loading and unloading operations. An upper section of vehicle 14 is shown in phantom lines to more clearly show the subject invention.

Figure 3:
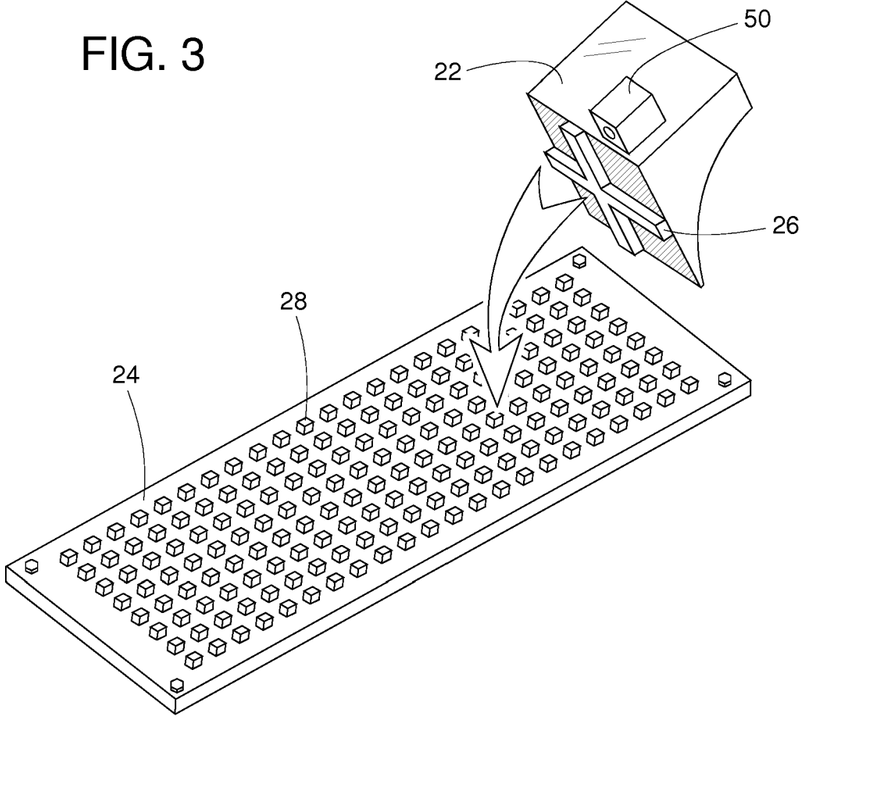
FIG. 3 is a perspective view of a wheel chock being lowered upon a mating base.
Figure 4:
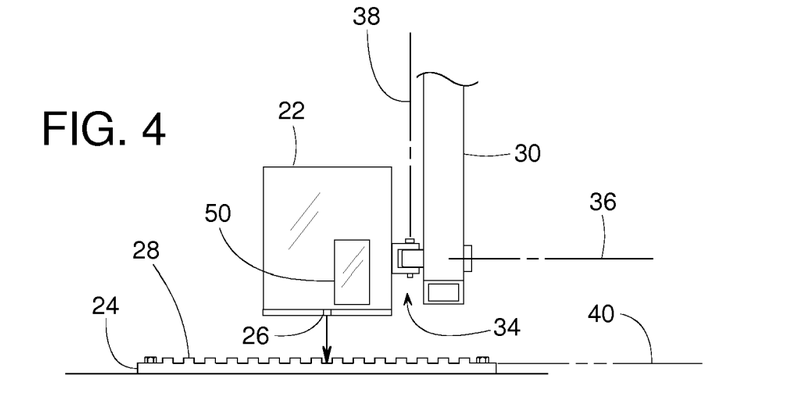
FIG. 4 is an end view looking toward the dock face and showing a wheel chock being lowered upon a base.

Wheel restraint 10 includes a wheel chock 22 that may, for example, rest upon a base 24 (lower support surface) when restraint 10 is in the holding position of FIG. 1. To limit the wheel chock's horizontal movement (particularly in a forward direction away from dock face 18) base 24 and/or chock 22 may include an interlocking feature such as a tooth 26 or 28 that engages a mating feature in the opposing surface, as shown in FIGS. 3 and 4. The various shapes, sizes, quantities and positions of tooth 26 and 28 are too numerous to mention, and it will be appreciated by those of ordinary skill in the art that the number of possible designs is unlimited.

To assist the repositioning of chock 22 between the holding and release positions, an elevated articulated arm 30 couples chock 22 to an anchor 32 that is attached to dock 16. Various joints of arm 30, anchor 32 and/or chock 22 enable chock 22 to be moved in three-dimensional space. To ensure that chock 22 can rest flat upon base 24, a joint 34 coupling arm 30 to chock 22, as shown in FIG. 4, permits chock 22 to rotate about a substantially horizontal axis 36 that is substantially parallel to dock face 18. To ensure the horizontal footprint of chock 22 can lie square to base 24 regardless of the chock's distance from dock face 18, joint 34 also allows chock 22 to rotate about a second axis 38 that is perpendicular to or at least traverses an imaginary horizontal plane 40. Joint 34 could be any multi-axis joint including, but not limited to, a universal ball joint.

To further assist the manual repositioning of chock 22, a spring 42 coupled to arm 30 helps offset the weight of chock 22 and arm 30. Counteracting the weight of arm 30 and chock 22 can be helpful while positioning chock 22; however, counteracting that weight is not always desired. The weight of arm 30 and chock 22, for instance, can actually be useful in holding chock 22 solidly against base 24. Thus, a spring release device 44 might be added so that spring 42 can be selectively stressed (FIG. 2) and released (FIG. 1). In the relaxed position of FIG. 1, the stress in spring 42 is reduced but does not necessarily have to be reduced to zero. In some examples, device 44 is a lever that can be toggled over center by rotating the lever about a pivot point 46. To limit the rotation of the lever, an end stop 48 on device 44 engages arm 30.

When chock 22 is in the holding position of FIG. 1, a sensor 50 mounted to chock 22 can be used determine whether chock 22 is actually fully engaged with base 24. Sensor 50 can be any device that can provide a signal 52 in response to proper engagement between chock 22 and base 24. Examples of sensor 50 include, but are not limited to, a proximity switch (e.g., Hall effect sensor), electromechanical switch, photoelectric eye, etc. Signal 52 can be transmitted via wires through arm 30 or can be transmitted wirelessly to control one or more signal lights 54.

Figure 5:
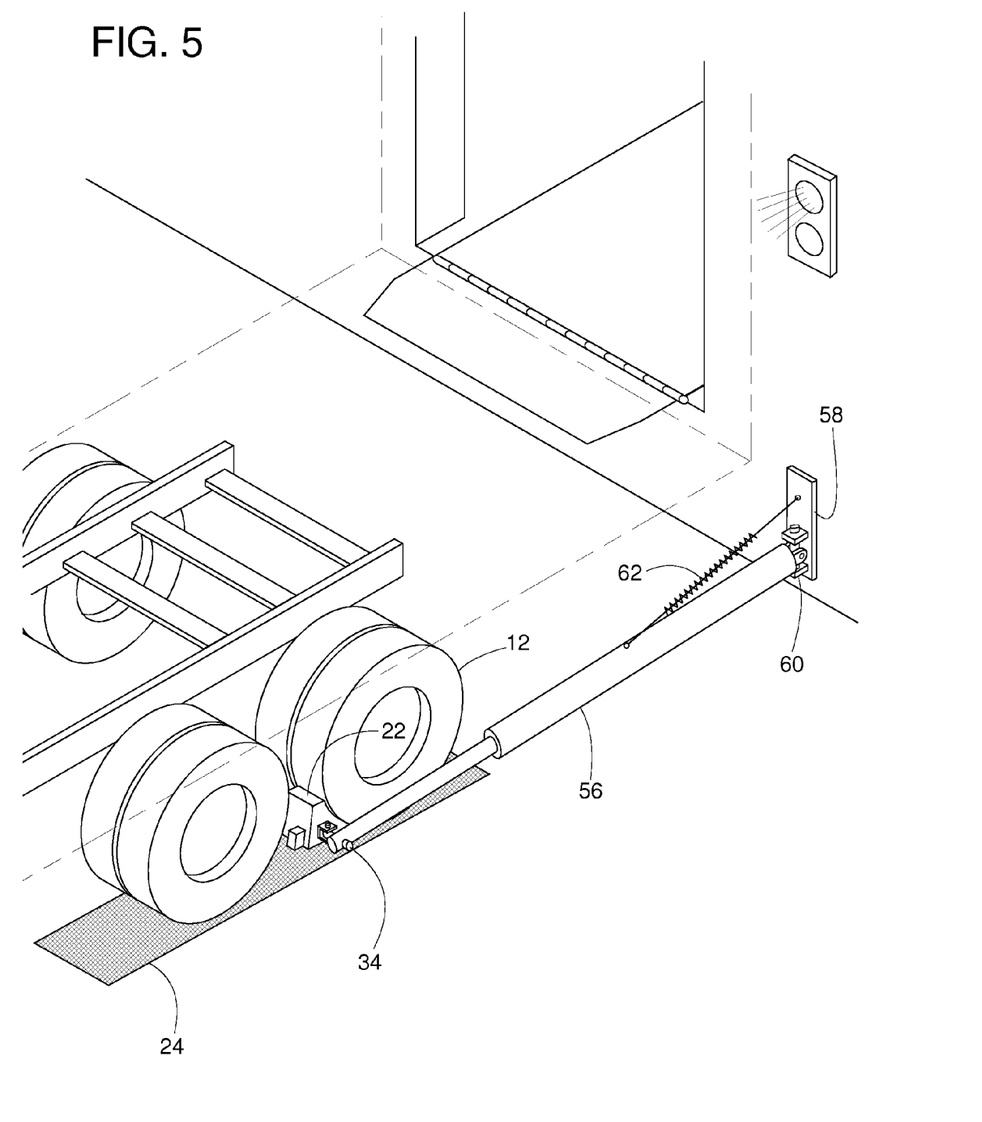
FIG. 5 is a perspective view similar to FIG. 1 but showing another example wheel restraint described herein.

FIG. 5 shows another example wherein a hydraulic cylinder 56 (hydraulic arm) replaces articulated arm 30. By controlling or stopping the flow of hydraulic fluid using conventional techniques, cylinder 56 can help hold wheel chock 22 at its holding position, as shown in FIG. 5. An anchor 58 with a pivotal joint 60 allows repositioning of cylinder 56 and chock 22. Similar to spring 42 of wheel restraint 10, a spring 62 can be used to help offset the weight of cylinder 56 and chock 22.

Figure 6:
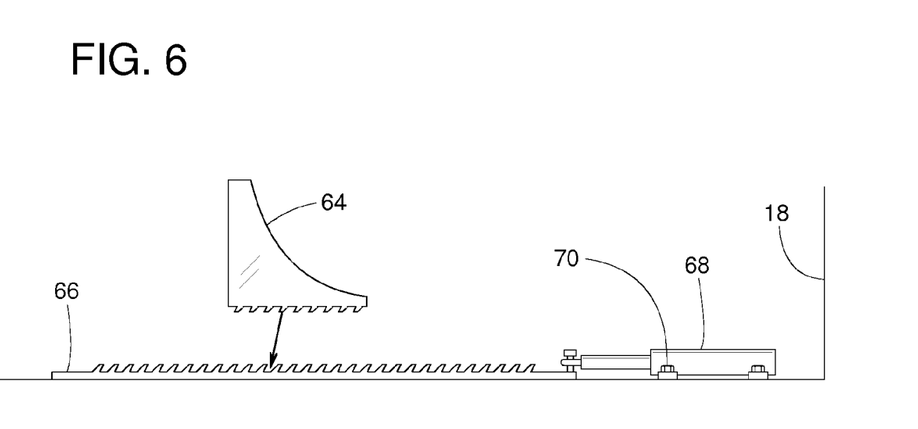
FIG. 6 is a side view of a wheel chock in a release position.
Figure 7:
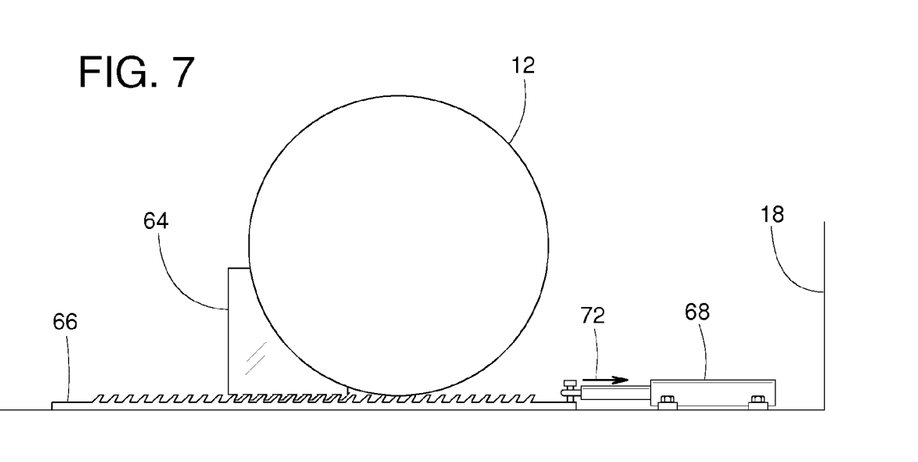
FIG. 7 is a side view similar to FIG. 6 but showing the chock in a holding position.

FIGS. 6 and 7 show a wheel chock 64 and a sliding base 66 with an alternate tooth design. This wheel restraint system includes a linear actuator 68 (e.g., a hydraulic cylinder, lead screw, etc.) that is held in place by an anchor 70 fixed to the loading dock. Actuator 68 can draw chock 64 tightly up against wheel 12 by pulling base 66 towards dock face 18, as indicated by arrow 72. To release wheel 12, actuator 68 extends to push base 66 and chock 64 away from dock face 18. Once chock 64 is no longer tightly up against wheel 12, chock 64 can be manually lifted from base 66. The mechanism for maintaining the chock in position shown in FIGS. 6 and 7 could be used with a manual chock, or one connected to a mechanism for facilitating chock placement such as that shown in FIGS. 1 and 2. The same holds true for the remaining examples or concepts described herein.

Figure 8:
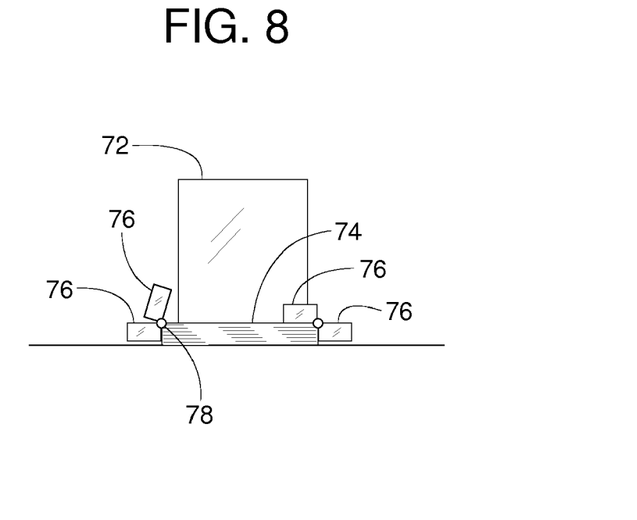
FIG. 8 is an end view similar to FIG. 4 but showing another example wheel chock described herein.
Figure 9:
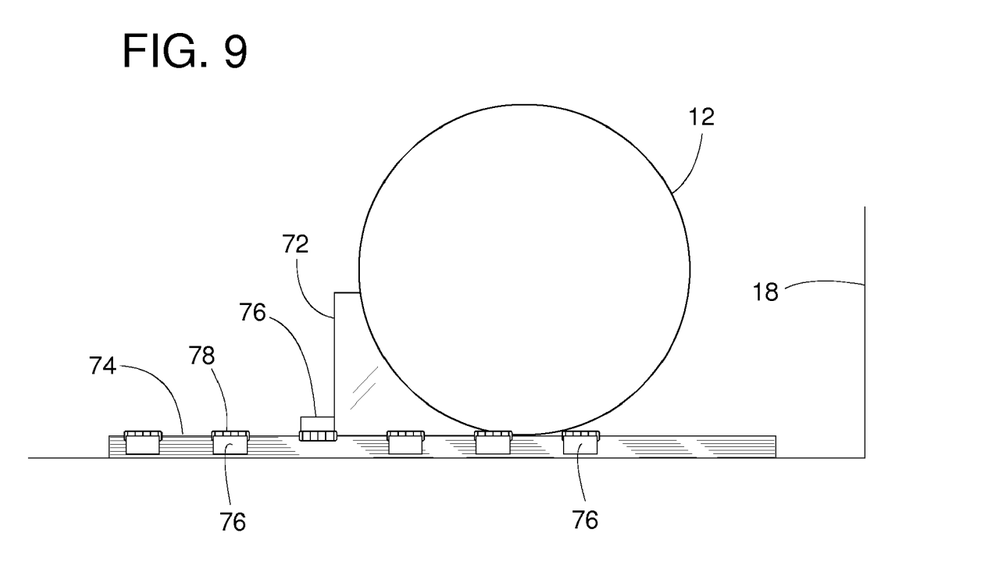
FIG. 9 is a side view similar to FIG. 7 but showing the wheel chock of FIG. 8.

FIGS. 8 and 9 show a wheel chock 72 resting upon a stationary base 74. To limit the chock's movement away from dock face 18, one or more hooks or latches 76 are pivotally connected to chock 72 or base 74. For the illustrated example, a hinge 78 connects each latch 76 to base 74 such that selected latches 76 can be pivoted upward to limit the movement of chock 72. Although it is generally more important to limit the chock's movement away from dock face 18, latches 76 and their mounting configuration to base 74 or chock 72 could be such that latches 76 restrict the chock's movement in other directions as well.

Figure 10:
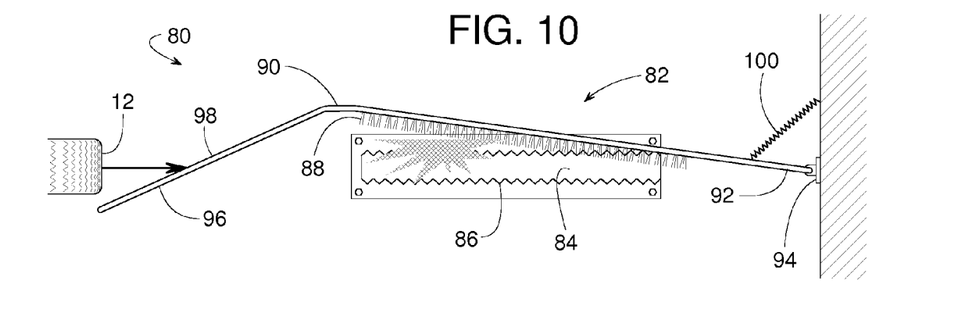
FIG. 10 is a top view of a cleaning system for the base of a wheel restraint system.
Figure 11:
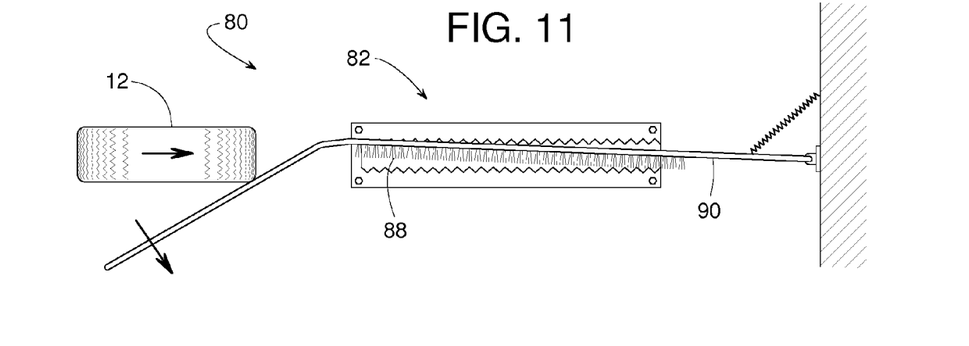
FIG. 11 is a top view similar to FIG. 10 but showing a brush sweeping across the base.
Figure 12:
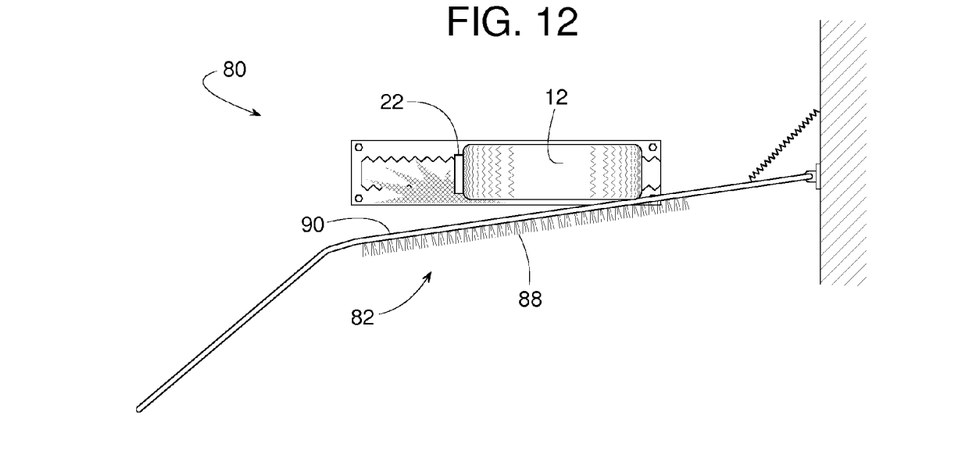
FIG. 12 is a top view similar to FIGS. 10 and 11 but showing the wheel restraint system in a holding position.

FIGS. 10, 11 and 12 show a wheel chock system 80 that includes a cleaning system 82 for inhibiting contaminants, such as dirt and ice, from accumulating on a base 84. To prevent ice from accumulating, a heating element 86, such as electrical resistive wire or some other heat-generating source, is installed in proximity (i.e., in heat exchange relationship) with base 84.

A brush 88 mounted to a movable arm 90 can be used to sweep dirt from base 84. One end 92 of arm 90 is pivotally coupled to an anchor 94. An opposite end 96 of arm 90 provides a cam surface 98 against which wheel 12 can push so that as a vehicle backs into the loading dock, the engagement of wheel 12 against cam surface 98 forces brush 88 to sweep across base 84. When the vehicle departs, a spring 100 can be used to pull arm 90 back to its position of FIG. 10. Alternatively, arm 90 could be power actuated. A linearly movable brush is also well within the scope of the invention.

Figure 13:
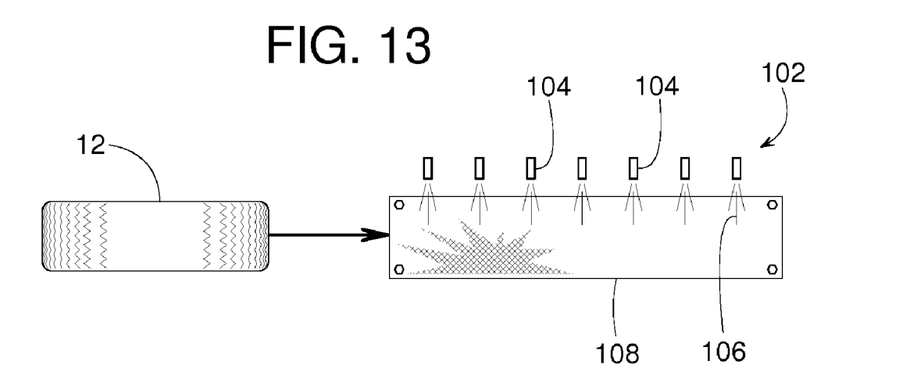
FIG. 13 is a top view similar to FIG. 10 but showing another example cleaning system described herein.

FIG. 13 shows an alternative cleaning system 102 that includes one or more nozzles 104 that discharges a fluid 106 (e.g., air, water or an ice-thawing liquid) to clear contaminants from a base 108 or some other lower support surface. Fluid discharge can be triggered manually, or it can be triggered automatically in response to a timer or a sensor responsive to a vehicle or the presence of a contaminant.

Figure 14:
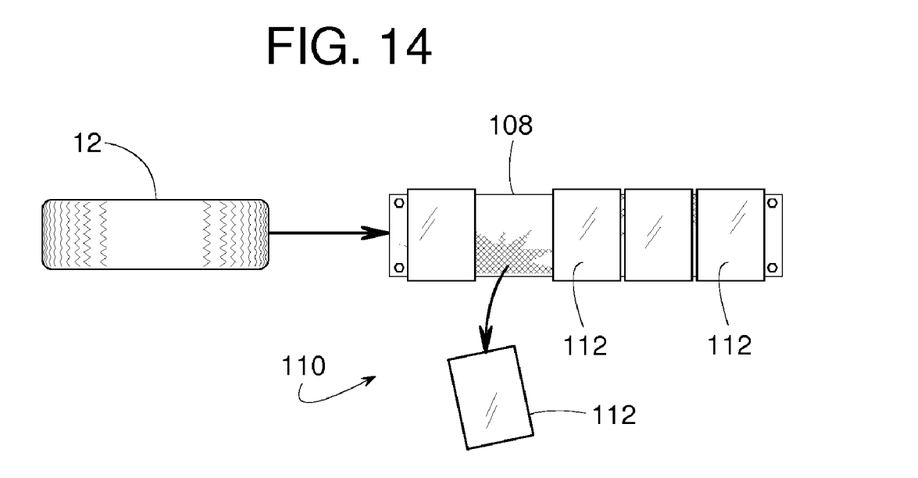
FIG. 14 is a top view similar to FIG. 13 but showing yet another example cleaning system described herein.
Figure 15:
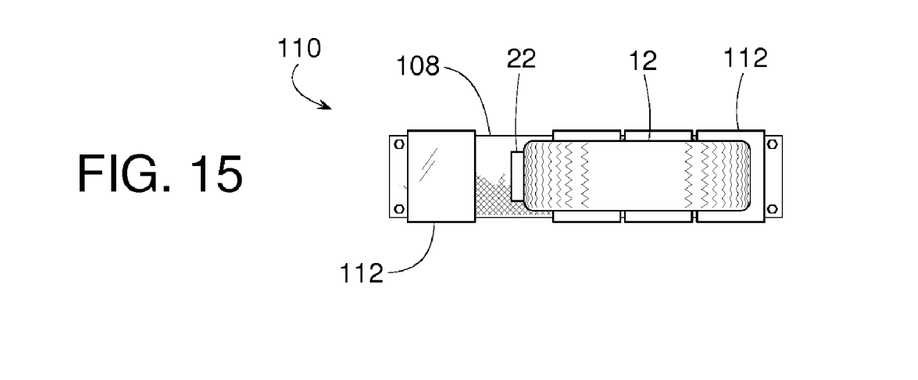
FIG. 15 is a top view similar to FIG. 14 but showing the wheel restraint system in a holding position.

FIGS. 14 and 15 show a cleaning system 110 wherein one or more covers 112 help shelter unused portions of base 108. For the illustrated example, covers 112 are moved manually by simply lifting the covers on or off of base 108. Alternatively, covers 112 can be hinged to base 108 so that covers 112 can be pivoted on and off.

Figure 16:
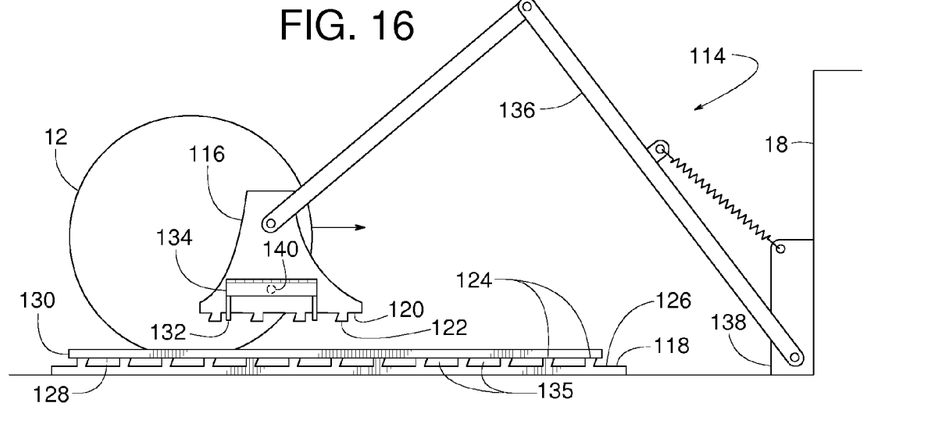
FIG. 16 is a side view of another example wheel restraint system described herein.
Figure 17:
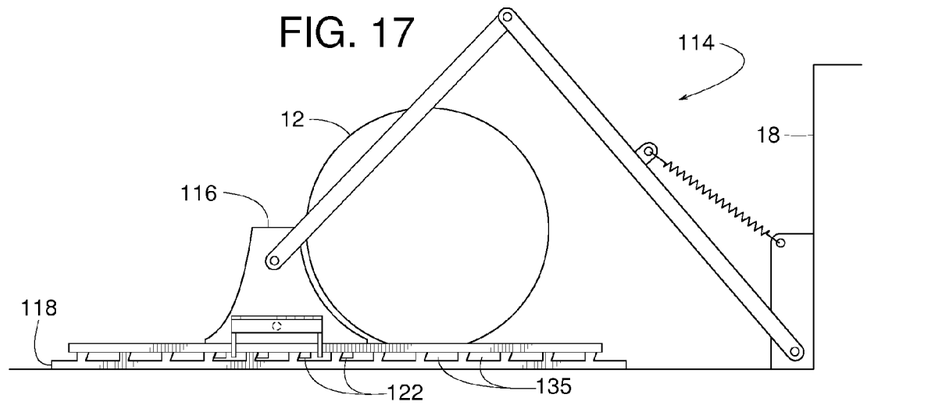
FIG. 17 is a side view similar to FIG. 16 but showing a vehicle's wheel being restrained by the example wheel restraint system of FIG. 16.
Figure 18:
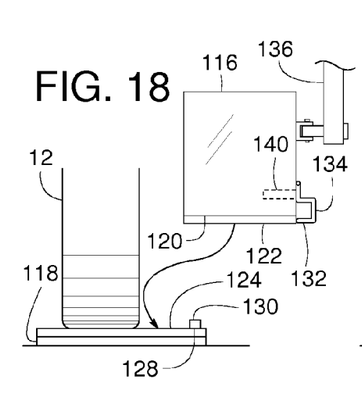
FIG. 18 is a left end view of FIG. 16.
Figure 19:
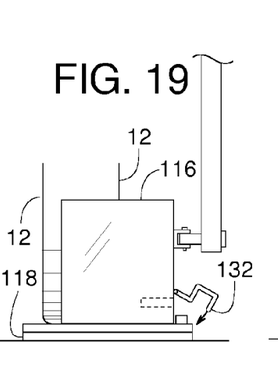
FIG. 19 is an end view similar to FIG. 18 but showing a chock of the example wheel restraint system of FIGS. 16-18 in an intermediate blocking position.
Figure 20:
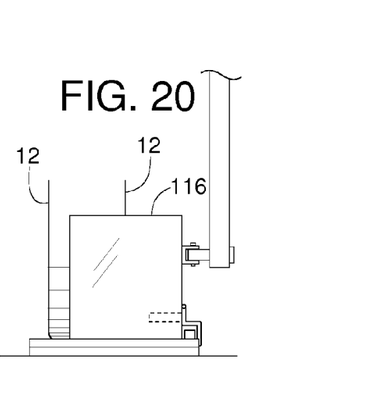
FIG. 20 is an end view similar to FIGS. 18 and 19 but showing the chock of the example wheel restraint system of FIGS. 16-19 in a blocking position.

FIGS. 16-20 show an example wheel chock system 114 with an enhanced ability to resist or prevent unintentional vertical separation between a wheel chock 116 and a base 118. FIGS. 16 and 18 show wheel chock 116 in a release position where chock 116 is intentionally separated or moved away from base 118 and clear of wheel 12, to allow the vehicle to freely depart the loading dock. FIGS. 17 and 20 show chock 116 in a blocking position to obstruct wheel 12 for the purpose of inhibiting the vehicle from moving too far away from dock face 18. FIG. 19 shows chock 116 at an intermediate position.

In this example, to restrict relative lateral movement (e.g., movement in a horizontal direction) between chock 116 and base 118 when chock 116 is in the blocking position (FIGS. 17 and 20), a bottom surface 120 of chock 116 includes a first plurality of teeth 122 that are placed in intermeshing engagement with a second plurality of teeth 124 on a surface 126 (e.g., a top surface) of base 118. Teeth 122 intermeshingly engage with teeth 124 to help prevent subsequent forward movement of wheel 12 from pushing or tipping chock 116 away from base 118. However, engagement of teeth 122 with teeth 124 may not effectively prevent other forces from lifting chock 116 up and/or away from base 118. To help prevent chock 116 from being lifted up and/or away from base 118, base 118 includes a first vertical resistance feature that interacts with a second vertical resistance feature on chock 116 to restrict relative vertical movement between the chock 116 and the base 118.

In this example, the first vertical resistance feature is an underside 128 of a bar 130 that overlies teeth 124 on base 118. The second vertical resistance feature, in this example, is a distal end 132 of a pivotal member 134 that is hinged to chock 116 such that member 134 can pivot between a latched position (FIG. 20) and an unlatched position (FIG. 19).

In the latched position, distal end 132 extends underneath bar 130 into a plurality gaps 135 between bar 130 and base 118 and engages or contacts the under surface 128 to inhibit vertical separation between chock 116 and base 118. With chock 116 in the blocking position and pivotal member 134 in the latched position, wheel restraint system 114 limits relative translation between chock 116 and base 118 in every direction of translation, e.g., straight upward and downward, straight forward and backward (left/right in FIG. 17), and straight laterally (left/right in FIG. 20). In the unlatched position, distal end 132 is swung out from underneath bar 130, which allows chock 116 to be readily lifted off of base 118.

Although second vertical resistance feature on chock 116 is shown as a pivotal member 134 that is hinged to chock 116, the second vertical resistance feature could also be a push-pull U-shaped bar that is pushed through gaps 135 and into engagement with chock 116 to a latched position. The U-shaped bar is then pulled out of chock 116 and gaps 135 to an unlatched position, allowing chock 116 to be moved to its release position.

To ease manual lifting of chock 116, some examples of wheel restraint system 114 includes a spring loaded articulated arm 136 that couples chock 116 to an anchor 138. Although spring loaded articulated arm 136 may make chock 116 easier to lift and/or move manually, spring loaded arm 136 may also apply forces to chock 116 that would tend to lift chock 116 up and/or away from base 118 when chock 116 is in its blocking position. The engagement between the first and second vertical resistance features resists these biasing forces, helping to prevent chock 116 from lifting up and/or away from base 118.

Some examples of chock 116 include a sensor 140 that provides a signal for indicating whether pivotal member 134 is in the latched or unlatched position. Examples of sensor 140 include, but are not limited to, a photoelectric eye, a limit switch, a Hall-Effect proximity sensor, etc.

One example sequence of operation begins with the vehicle backing toward dock face 18 with wheel 12 rolling over the top of base 118, as shown in FIG. 16. As the vehicle is backing into the dock, wheel chock 116 is in the release position, as shown in FIGS. 16 and 18. After the vehicle is properly positioned relative to dock face 18 and/or base 118 as shown in FIG. 17, chock 116 is lowered onto base 118 in front of wheel 12 and teeth 122 are enmeshed with teeth 124 as shown in FIG. 18 to substantially limit and preferably prevent movement between chock 116 and base 118 in a first direction (e.g., movement in a horizontal direction). At the intermediate position, shown in FIG. 19, pivotal member 134 is manipulated to move distal end 132 underneath bar 130 to the latched position as shown in FIG. 20 to substantially limit and preferably prevent movement between chock 114 and base 118 in a second direction (e.g., movement in a vertical direction). At this point, shown in FIGS. 17 and 20, the vehicle is restrained by virtue of chock 116 being in the blocking position while member 134 is in the latched position. The vehicle is released by reversing the example operating sequence.

Figure 21:
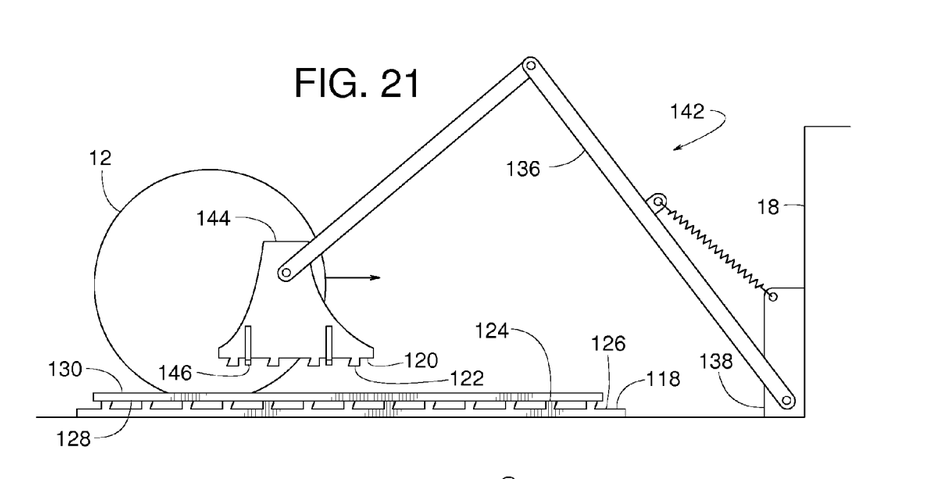
FIG. 21 is a side view of another example wheel restraint system described herein.
Figure 22:
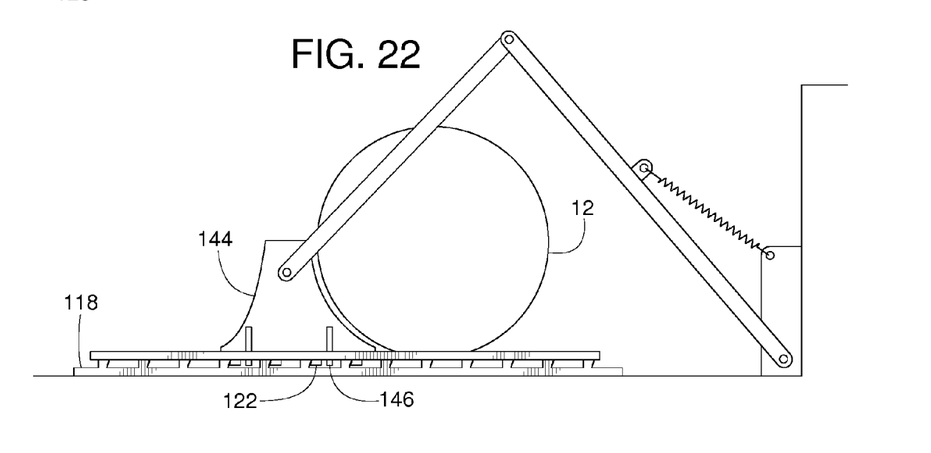
FIG. 22 is a side view similar to FIG. 21 but showing a vehicle's wheel being restrained by the example wheel restraint system of FIG. 21.
Figure 23:
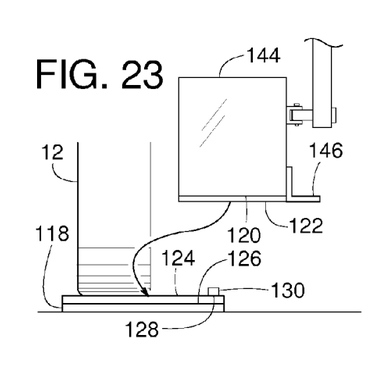
FIG. 23 is a left end view of FIG. 21.
Figure 24:
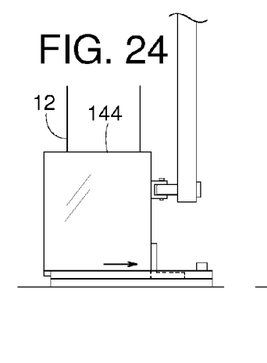
FIG. 24 is an end view similar to FIG. 23 but showing a chock of the example wheel restraint system of FIGS. 21-23 in an intermediate blocking position.
Figure 25:
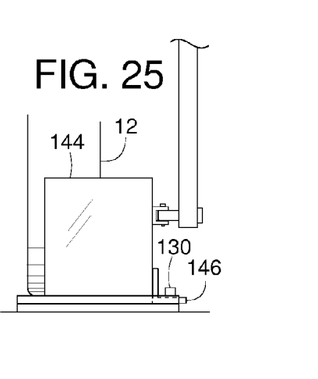
FIG. 25 is an end view similar to FIGS. 23 and 24 but showing the chock of the example wheel restraint system of FIGS. 21-24 in a blocking position.

FIGS. 21-25 show another example wheel chock system 142 with an enhanced ability to resist unintentional vertical separation between a wheel chock 144 and base 118. FIGS. 21 and 23 show wheel chock 144 in a release position where chock 144 is intentionally separated or moved away from base 118 and clear of wheel 12, to allow the vehicle to freely depart the loading dock. FIGS. 22 and 25 show chock 144 in a blocking position to obstruct wheel 12 for the purpose of inhibiting the vehicle from moving too far away from dock face 18. FIG. 24 shows chock 144 at an intermediate position.

In this example, to restrict relative horizontal movement between chock 144 and base 118 when chock 144 is in the blocking position (FIGS. 22 and 25), bottom surface 120 of chock 144 includes first plurality of teeth 122 that are placed in intermeshing engagement with second plurality of teeth 124 on the top surface 126 of base 118. Teeth 122 intermeshingly engage with teeth 124 to help prevent subsequent forward movement of wheel 12 from pushing or tipping chock 116 away from base 118. However, engagement of teeth 122 with teeth 124 may not effectively prevent other forces from lifting chock 116 up and/or away from base 118. To help prevent chock 116 from being lifted up and/or away from base 118, base 118 includes a first vertical resistance feature that interacts with a second vertical resistance feature on chock 116.

In this example, the first vertical resistance feature is underside 128 of bar 130 that overlies teeth 124 on base 118. The second vertical resistance feature, in this example, is a protrusion 146 that extends from the side of chock 144 and by repositioning chock 144 can be selectively positioned between a latched position (FIG. 25) and an unlatched position (FIGS. 23 and 24).

In the latched position, protrusion 146 extends underneath bar 130 and engages or contacts the underside 126 of bar 130 to inhibit vertical separation or movement between chock 144 and base 118. With chock 144 in the blocking position and protrusion 146 in the latched position, wheel restraint system 142 limits relative translation between chock 144 and base 118. In the unlatched position, protrusion 146 is moved out from underneath bar 130, which allows chock 144 to be readily lifted off of, and/or moved away from base 118. To ease manual lifting of chock 144, some examples of wheel restraint system 142 include spring loaded articulated arm 136 that couples chock 144 to anchor 138. Although spring loaded articulated arm 136 may make chock 116 easier to lift and move manually, spring loaded arm 136 may also apply forces to chock 116 that would tend to lift chock 116 up and away from base 118 when chock 116 is in its blocking position. The engagement between the first and second vertical resistance features resists these biasing forces, helping to prevent chock 116 from lifting up and/or away from base 118.

One example sequence of operation begins with the vehicle backing toward dock face 18 with wheel 12 rolling over the top of base 118, as shown in FIG. 21. As the vehicle is backing into the dock, wheel chock 144 is in the release position, as shown in FIGS. 21 and 23. After the vehicle is properly positioned relative to dock face 18 and/or base 118, as shown in FIG. 22, chock 144 is lowered onto base 118 in front of wheel 12 and teeth 122 are enmeshed with teeth 124 as shown in FIG. 23 to substantially limit and preferably prevent movement between the chock 144 and the base 118 in a first direction (e.g., movement in a horizontal direction). At the intermediate position, shown in FIG. 24, chock 144 is slid over to move protrusion 146 underneath bar 130 to the latched position as shown in FIG. 25 to substantially limit and preferably prevent movement between chock 144 and base 118 in a second direction (e.g., movement in a vertical direction). At this point, shown in FIGS. 22 and 25, the vehicle is restrained by virtue of chock 144 being in the blocking position while protrusion 146 is in the latched position. The vehicle is released by reversing the example operating sequence.

Figure 26:
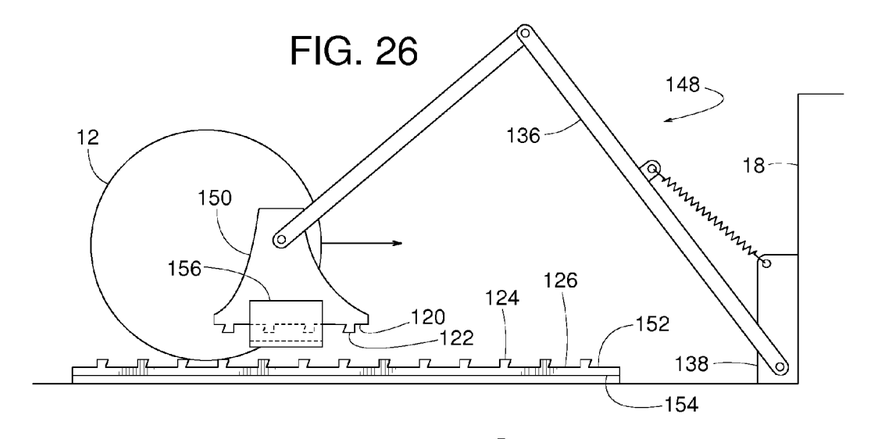
FIG. 26 is a side view of another example wheel restraint system described herein.
Figure 27:
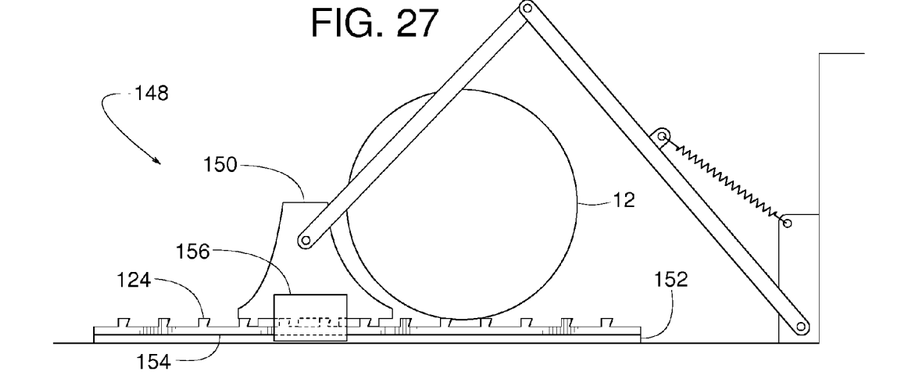
FIG. 27 is a side view similar to FIG. 26 but showing a vehicle's wheel restrained by the example wheel restraint system of FIG. 26.
Figure 28:
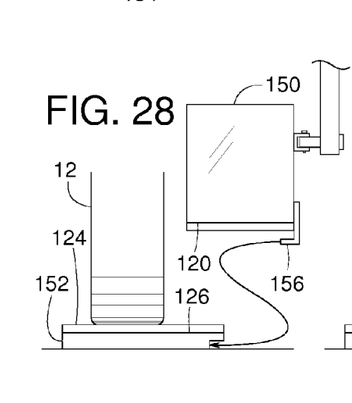
FIG. 28 is a left end view of FIG. 26.
Figure 29:
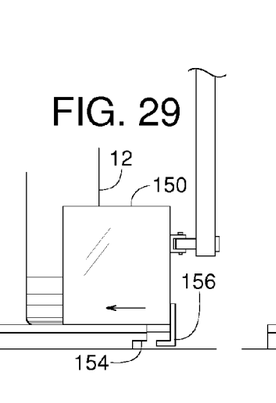
FIG. 29 is an end view similar to FIG. 28 but showing a chock of the example wheel restraint system of FIGS. 26-28 in an intermediate blocking position.
Figure 30:
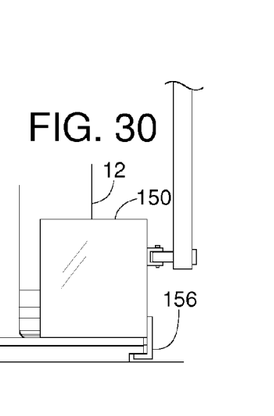
FIG. 30 is an end view similar to FIGS. 28 and 29 but showing the chock of the example wheel restraint system of FIGS. 26-29 in a blocking position.

FIGS. 26-30 show another example wheel chock system 148 with an enhanced ability to resist and/or prevent unintentional vertical separation or movement between a wheel chock 150 and a base 152. FIGS. 26 and 28 show wheel chock 150 in a release position where chock 150 is intentionally separated from base 152 and clear of wheel 12, to allow the vehicle to freely depart the loading dock. FIGS. 27 and 30 show chock 150 in a blocking position to obstruct wheel 12 for the purpose of inhibiting the vehicle from moving too far away from dock face 18. FIG. 29 shows chock 150 at an intermediate position.

In this example, to restrict relative horizontal movement between chock 150 and base 152 when chock 150 is in the blocking position (FIGS. 27 and 30), bottom surface 120 of chock 150 includes first plurality of teeth 122 that are placed in intermeshing engagement with second plurality of teeth 124 on the top surface 126 of base 152. Teeth 122 intermeshingly engage with teeth 124 to help prevent subsequent forward movement of wheel 12 from pushing or tipping chock 116 away from base 118. However, engagement of teeth 122 with teeth 124 may not effectively prevent other forces from lifting chock 116 up and/or away from base 118. To help prevent chock 116 from being lifted up and/or away from base 118, base 118 includes a first vertical resistance feature that interacts with a second vertical resistance feature on chock 116.

In this example, the first vertical resistance feature is an underside edge 154 of base 152. The second vertical resistance feature, in this example, is an L-shaped bracket 156 that extends from the side of chock 150 and by repositioning chock 150 can be selectively positioned between a latched position (FIG. 30) and an unlatched position (FIGS. 28 and 29).

In the latched position, bracket 156 extends or engages underneath edge 154 to inhibit vertical separation between chock 150 and base 152. With chock 150 in the blocking position and bracket 156 in the latched position, wheel restraint system 148 limits relative translation between chock 150 and base 152. In the unlatched position, bracket 156 is moved out from underneath edge 154, which allows chock 150 to be readily lifted off of base 152. To ease manual lifting of chock 150, some examples of wheel restraint system 148 includes spring loaded articulated arm 136 that couples chock 150 to anchor 138. Although spring loaded articulated arm 136 may make chock 116 easier to lift and move manually, spring loaded arm 136 may also apply forces to chock 116 that would tend to lift chock 116 up and away from base 118 when chock 116 is in its blocking position. The engagement between the first and second vertical resistance features resists these biasing forces, helping to prevent chock 116 from lifting up and/or away from base 118.

One example sequence of operation begins with the vehicle backing toward dock face 18 with wheel 12 rolling over the top of base 152, as shown in FIG. 26. As the vehicle is backing into the dock, wheel chock 150 is in the release position, as shown in FIGS. 26 and 28. After the vehicle is properly positioned relative to dock face 18 and/or the base 118 as shown in FIG. 27, chock 150 is lowered onto base 152 in front of wheel 12 and teeth 122 are enmeshed with teeth 124 as shown in FIG. 28 to substantially limit and preferably prevent movement between chock 150 and base 118 in a first direction (e.g., movement in a horizontal direction). At the intermediate position shown in FIG. 29, chock 150 is slid or positioned to move bracket 156 underneath edge 154 in the latched position as shown in FIG. 30 to substantially limit and preferably prevent movement between chock 150 and base 118 in a second direction (e.g., movement in a vertical direction). At this point, shown in FIGS. 27 and 30, the vehicle is restrained by virtue of chock 150 being in the blocking position while bracket 156 is in the latched position. The vehicle is released by reversing the example operating sequence. Many of the wheel restraint features disclosed herein are interchangeable among the various examples described herein.

Some of the aforementioned examples may include one or more features and/or benefits including, but not limited to, the following:

In some examples, a wheel chock for restraining a vehicle at a loading dock is supported by a spring loaded articulated arm, wherein the spring force can be released.

In some examples, a wheel chock is supported by an articulated arm that includes a pivotal joint where the arm connects to the chock, wherein the joint permits the chock to rotate relative to the arm about a vertical axis.

In some examples, a wheel chock includes a sensor that detects whether the chock is fully engaged with a lower support surface.

In some examples, a manually manipulated wheel chock is coupled to a hydraulic cylinder that can forcibly draw the chock against a vehicle's wheel.

In some examples, a wheel chock can be manually placed upon a mating base plate, and a hydraulic cylinder can move the plate to force the chock against a vehicle's wheel.

In some examples, a set of hooks or latches selectively engage and release a wheel chock from a lower support surface that is anchored to the ground.

In some examples, a manually operated wheel chock includes a cleaning system that inhibits debris, ice and other contaminants from accumulating on a surface upon which the chock is placed.

In some examples, a wheel chock includes a first plurality of teeth that engage a second plurality of teeth of a base anchored to the ground to substantially limit and preferably prevent movement of the wheel chock relative to the base in a first direction and a protrusion to engage a surface of the base to prevent movement of the wheel chock relative to the base in a second direction different than the first direction.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A wheel restraint system to engage a wheel of a vehicle at a loading dock, the wheel restraint system comprising:
    a base that includes a top surface having a first plurality of teeth and a first vertical resistance feature adjacent the first plurality of teeth and having a continuous surface extending substantially along a longitudinal length of the base, the first plurality of teeth being distinct from the first vertical resistance feature; and
    a wheel chock that includes a bottom surface having a second plurality of teeth and a second vertical resistance feature adjacent the second plurality of teeth, the second plurality of teeth being distinct from the second vertical resistance feature, the wheel chock being selectively movable between a blocking position and a release position such that:
a) in the blocking position, the wheel chock obstructs the wheel, the bottom surface is in intermeshing engagement with the top surface to limit relative horizontal movement therebetween, and the second vertical resistance feature is underneath the continuous surface of the first vertical resistance feature to resist or prevent vertical separation between the bottom surface and the top surface; and
b) in the release position, the wheel chock is clear of the wheel, the bottom surface is spaced-apart and above the top surface, and the second vertical resistance feature is spaced-apart and above the first vertical resistance feature.

2. The wheel restraint system of claim 1, wherein the first plurality of teeth engage the second plurality of teeth when the wheel chock is in the blocking position, and the first plurality of teeth disengage the second plurality of teeth when the wheel chock is in the release position.

3. The wheel restraint system of claim 1, further comprising:
a bar overlying and fixed to the first plurality of teeth to provide the continuous surface and create a plurality of gaps underneath the bar, above the base and among the first plurality of teeth, such that:
a) in the blocking position, the second plurality of teeth engage the first plurality of teeth, and the second vertical resistance feature extends underneath the bar; and
b) in the release position, the second plurality of teeth is spaced apart from the first plurality of teeth and the second vertical resistance feature is spaced apart from the bar.

4. The wheel restraint system of claim 1, further comprising a pivotal member attached to the wheel chock and being pivotal relative thereto between a latched position and an unlatched position, the pivotal member includes the second vertical resistance feature, the second vertical resistance feature is to extend underneath the first vertical resistance feature when the pivotal member is in the latched position while the bottom surface is engaged with the top surface, and the second vertical resistance feature is spaced-apart from the first vertical resistance feature when the pivotal member is in the unlatched position while the bottom surface is engaged with the top surface.

5. The wheel restraint system of claim 4, further comprising a sensor operatively coupled to the pivotal member to provide a signal indicative of whether the pivotal member is in the latched position or the unlatched position.

6. The wheel restraint system of claim 1, wherein the bottom surface of the wheel chock engaging the top surface of the base, and the second vertical resistance feature being underneath the first vertical resistance feature limits relative translation between the wheel chock and base in every direction of straight translation.

7. The wheel restraint system of claim 1, further comprising:
an anchor mountable to the loading dock; and
an articulated arm coupling the wheel chock to the anchor.

8. The wheel restraint system of claim 1, wherein the continuous surface is located below the top surface of the base.

9. The wheel restraint system of claim 1, wherein at least a portion of the second vertical resistance feature is positioned adjacent a side surface of the wheel chock, the side surface being perpendicular to the bottom surface of the wheel chock.

10. A wheel restraint system to engage a wheel of a vehicle at a loading dock, the wheel restraint system comprising:
a base that includes a top surface having a first plurality of teeth;
a bar overlying and fixed to the first plurality of teeth, an underside of the bar providing a continuous first vertical resistance feature extending substantially along a longitudinal length of the base, the first vertical resistance feature positioned adjacent to and being different from the first plurality of teeth;
a wheel chock that includes a bottom surface having a second plurality of teeth; and
a pivotal member coupled to a side surface of the wheel chock adjacent the bottom surface, the pivotal member to pivot relative to the wheel chock between a latched position and an unlatched position, the pivotal member includes a second vertical resistance feature, the second vertical resistance feature positioned adjacent to and being different from the second plurality of teeth, the wheel chock being selectively movable between a blocking position and a release position such that:
a) in the blocking position, the wheel chock obstructs the wheel, the second plurality of teeth of the bottom surface enmesh the first plurality of teeth of the top surface to limit relative horizontal movement between the wheel chock and the base, and the pivotal member is in the latched position with the second vertical resistance feature being underneath the first vertical resistance feature to restrict vertical separation between the bottom surface and the top surface; and
b) in the release position, the wheel chock is clear of the wheel, the bottom surface is spaced apart from the top surface, and the pivotal member is in the unlatched position with the second vertical resistance feature being spaced-apart from the first vertical resistance feature.

11. The wheel restraint system of claim 10, further comprising a sensor operatively associated with the pivotal member to provide a signal indicative of whether the pivotal member is in the latched position or the unlatched position.

12. The wheel restraint system of claim 10, wherein the bottom surface of the wheel chock is to engage the top surface of the base when the second vertical resistance feature is underneath the first vertical resistance feature to limit relative translation between the wheel chock and base.

13. The wheel restraint system of claim 10, further comprising:
an anchor mountable to the loading dock; and
an articulated arm coupling the wheel chock to the anchor.

14. A wheel restraint method for selectively blocking and releasing a wheel of a vehicle at a loading dock, wherein the wheel restraint includes a wheel chock and a base, the wheel restraint method comprising:
moving the wheel chock between a release position to release the wheel and a blocking position to block the wheel, the wheel chock being spaced-apart from the base when the wheel chock is in the release position, a bottom surface of the wheel chock to engage a top surface of the base when the wheel chock is in the blocking position such that a first plurality of teeth of the base enmesh with a second plurality of teeth of the wheel chock;
after moving the wheel chock to the blocking position, moving a second vertical resistance feature of the wheel chock into engagement with a continuous surface of a first vertical resistance feature of the base to limit upward movement of the wheel chock relative to the base, the first vertical resistance feature attached to the base adjacent the top surface and extending substantially along a longitudinal length of the base and the second vertical resistance feature being attached on the wheel chock adjacent the bottom surface of the wheel chock, the first vertical resistance feature being separate from the first plurality of teeth and the second vertical resistance feature being separate from the second plurality of teeth;

subsequently moving the second vertical resistance feature away from the first vertical resistance feature; and moving the wheel chock from the blocking position to the release position to disengage the bottom surface of the wheel chock and the top surface of the base.

15. The wheel restraint method of claim 14, wherein the first vertical resistance feature is provided by the continuous surface of a bar overlying and fixed to the plurality of teeth.

16. The wheel restraint method of claim 14, wherein moving the second vertical resistance feature involves rotating the second vertical resistance feature relative to the wheel chock.

17. The wheel restraint method of claim 14, further comprising providing a signal that indicates that the second vertical resistance feature is underneath the first vertical resistance feature.

18. The wheel restraint method of claim 14, further comprising limiting relative translation between the wheel chock and the base in every direction of straight translation when the wheel chock is in the blocking position and the second vertical resistance feature is engaged with the first vertical resistance feature.

19. The wheel restraint method of claim 14 further comprising using an articulated arm to support at least some weight of the wheel chock.

20. The wheel restraint system of claim 14, wherein the continuous surface is located below the top surface of the base.

* * * * *